W. L. CHURCH.
PROTECTIVE COATING FOR METALLIC MEMBERS.
APPLICATION FILED OCT. 7, 1912.
1,104,346.
Patented July 21, 1914.
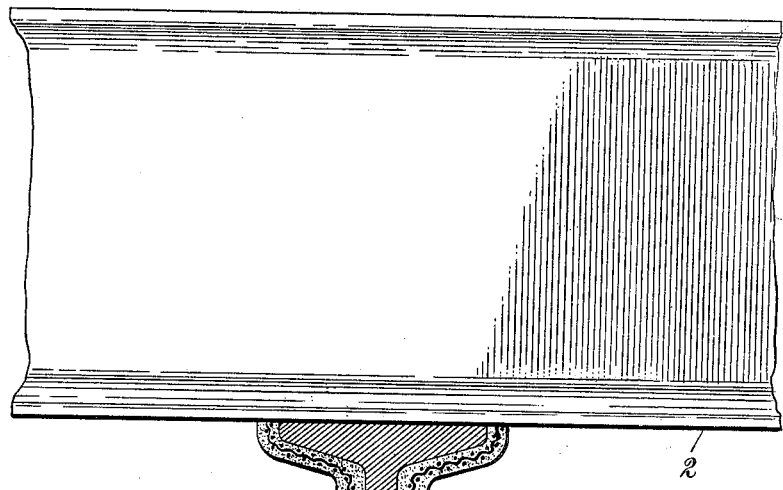
Fig. 1.
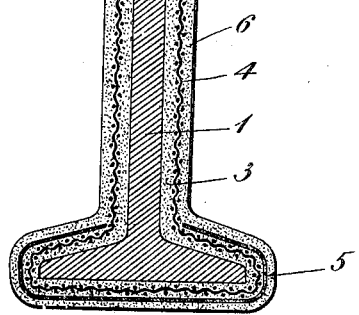
Fig. 2.
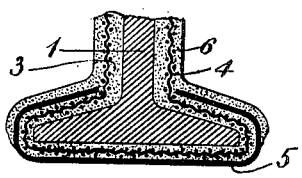
WITNESSES:
E. B. Tomlinson
Patrick J. Conroy
INVENTOR:
William L. Church
by Browne & Woodworth
attys.

UNITED STATES PATENT OFFICE.

WILLIAM L. CHURCH, OF NEWTON CENTER, MASSACHUSETTS, ASSIGNOR TO AMBURSEN COMPANY, OF BOSTON, MASSACHUSETTS, A CORPORATION OF NEW JERSEY.

PROTECTIVE COATING FOR METALLIC MEMBERS.

1,104,346.

Specification of Letters Patent. Patented July 21, 1914.

Application filed October 7, 1912. Serial No. 724,288.

*To all whom it may concern:*

Be it known that I, WILLIAM L. CHURCH, a citizen of the United States, and a resident of Newton Center, in the county of Middlesex and State of Massachusetts, have invented a new and useful Improvement in Protective Coatings for Metallic Members, of which the following is a specification.

My present invention relates to protective coatings for metallic members, and more especially to coatings for use with metallic beams employed in proximity to steam railways, such, for example, as the supporting I-beam for bridges over railways.

It has been found that metallic supporting members over steam railways are corroded by the action of steam which contains a certain amount of sulfurous acid and are abraded by the action of the cinders emitted by the smoke-stack, and that protective coatings, even coatings of concrete or cement, will not withstand such corrosive and abrasive action.

It is therefore the object of my invention to provide a composite protective-coating for metallic members that will not be subject to the defects above mentioned, and such coating embodies, among other things, a sheet of semi-elastic acid-proof material, such as asbestos.

In the drawing which accompanies and forms a part of this specification, Figure 1 represents one embodiment of my invention applied to an I-beam, and Fig. 2 is a fragmentary view showing the lower portion of the concrete layer worn away.

In the particular drawing selected for more fully disclosing my invention, 1 represents an I-beam, supporting or supported by a girder 2. Around this I-beam and slightly spaced therefrom, I arrange a reinforcing member 4, herein shown as a metallic mesh, and then apply concrete or cement thereto, either manually or else by a cement gun, whereby the material is forcibly projected against the reinforcing member and I-beam, until the mesh is slightly embedded. Over the layer of concrete so formed I dispose a sheet of semi-elastic acid-proof material 5, such as asbestos. In the case of an I-beam, the sheet of asbestos may, as shown, extend around the lower flange of the beam only, although of course it will be understood that it may extend over the entire surface of the member 4 if desired. I then complete the coating operation, either manually or by a cement gun, and form the outer layer 6, in which the asbestos is embedded. I prefer to apply the cement or concrete coatings by means of a cement gun, because concrete so applied will be very much denser than that which is applied manually.

In the course of time the lower portion of the outer concrete layer of an I-beam protected as above described may be worn away as shown in Fig. 2, by the action of the steam and cinders, but the beam will still be protected by the asbestos sheet which is acid-resisting and which is sufficiently elastic to resist the abrasive action of the cinders. However, if desired, such portion of the outer coating as is so worn away may be replaced manually or by a cement gun, so that a beam protected in the manner above described becomes practically indestructible.

It will be understood that various modifications may be made in the particular composite coating above described without departing from the spirit of my invention.

In the claims I use the word "concrete" as covering cement or the like.

I claim:

1. The combination of a metallic member, with a protective covering therefor, such covering comprising a sheet of semi-elastic acid proof material such as asbestos bent around the member, and a coating of concrete wholly enveloping said member and sheet.

2. The combination of a metallic member, with a protective covering therefor, such covering comprising a sheet of semi-elastic acid proof material such as asbestos partially surrounding but spaced from said member, and a coating of concrete in which said member and sheet are wholly embedded.

3. The combination of a metallic member, with a protective covering therefor, such covering comprising a spaced reinforcing fabric and a sheet of semi-elastic acid proof material such as asbestos outwardly spaced from the reinforcing fabric, and a coating of concrete in which are wholly embedded the metallic member, the reinforcing fabric, and the sheet of asbestos.

In testimony whereof, I have hereunto subscribed my name this 5th day of Oct., 1912.

WILLIAM L. CHURCH.

Witnesses:
AARON C. DANIELS,
CHARLES E. PARSONS.